United States Patent [19]

Dague

[11] Patent Number: 5,213,095
[45] Date of Patent: May 25, 1993

[54] COUPLING APPARATUS FOR SCUBA GEAR

[76] Inventor: Lawrence M. Dague, 1221 Lakeshore Dr., Irving, Tex. 75060

[21] Appl. No.: 651,316

[22] Filed: Feb. 6, 1991

[51] Int. Cl.$^5$ ............... A61M 16/00; A62B 7/04; A62B 9/04; A62B 9/02
[52] U.S. Cl. ............... 128/204.18; 128/202.27; 128/204.26; 128/205.25; 128/205.24
[58] Field of Search ............... 128/200.24, 200.29, 128/201.11, 201.26, 201.27, 201.28, 201.29, 202.11, 202.27, 204.18, 204.26, 205.22, 205.24, 911, 912, 207.14, 207.15, 205.25

[56] References Cited

U.S. PATENT DOCUMENTS

| | | | |
|---|---|---|---|
| 4,062,356 | 12/1977 | Merrifield | 128/205.22 |
| 4,166,462 | 9/1979 | Ellis | 128/202.14 |
| 4,328,798 | 5/1982 | Isaacson | 128/204.18 |
| 4,469,835 | 9/1984 | Laurin | 128/912 |
| 4,603,833 | 8/1986 | Christianson | 128/202.27 |
| 4,714,077 | 12/1987 | Lambert | 128/202.27 |
| 4,787,655 | 11/1988 | Gross et al. | 128/205.24 |
| 4,827,921 | 5/1989 | Rugheimer | 128/202.27 |
| 4,840,199 | 6/1989 | Brunt, Jr. | 128/202.27 |
| 4,974,584 | 12/1990 | Goodnoe | 128/202.27 |
| 5,062,420 | 11/1991 | Levine | 128/207.14 |

Primary Examiner—Edgar S. Burr
Assistant Examiner—Kimberly L. Asher
Attorney, Agent, or Firm—W. Kirk McCord

[57] ABSTRACT

Apparatus for coupling a compressed gas supply hose to a gas pressure regulator includes first and second elbow fittings, each of which has opposed male and female ends. The male end of the first elbow fitting matingly engages a female fitting on the pressure regulator and the female end thereof is in mating engagement with a complementary male end of the second elbow fitting. The female end of the second elbow fitting is attached to a male fitting on one end of the hose. The male end of the first elbow fitting is constrained against rotation about a lateral axis, along which the male end of the first elbow fitting is connected to the pressure regulator, so that the first elbow fitting is substantially inhibited from rotation with respect to the pressure regulator. The first and second elbow fittings are rotatable with respect to one another about a vertical axis extending between the aforementioned lateral axis and another lateral axis, along which the hose is connected to the second elbow fitting. The coupling apparatus allows the diver to turn his head freely in the direction of the air hose without substantial resistance therefrom because the second elbow fitting and a portion of the hose adjacent thereto can be swivelled with respect to the first elbow fitting and the pressure regulator.

12 Claims, 4 Drawing Sheets

COUPLING APPARATUS FOR SCUBA GEAR

FIELD OF THE INVENTION

This invention relates generally to scuba diving equipment and in particular to apparatus for coupling an air supply hose to an air pressure regulator.

BACKGROUND OF THE INVENTION

Scuba diving equipment includes relatively sophisticated equipment for regulating the flow of a compressed gas, such as compressed air, from a storage tank when the diver inhales and for exhausting carbon dioxide and other waste gases when the diver exhales. The scuba equipment typically includes a mouthpiece through which the diver breathes and a pressure regulator coupled between the mouthpiece and the storage tank by means of a plurality of air hoses for regulating the amount of compressed gas breathed by the diver when the diver inhales and for exhausting carbon dioxide and other waste gases when the diver exhales.

The air supply hose enters the pressure regulator on one side thereof (e.g., on the right side thereof from the diver's perspective), such that when the diver turns his head to the right he will encounter substantial resistance from the pressurized air hose, which may cause the mouthpiece to be dislodged, or at the very least, will make it difficult for the diver to turn his head to that side.

DESCRIPTION OF THE PRIOR ART

Prior art attempts to overcome the problem of air hose resistance when the diver turns his head in the direction of the hose have included the installation of a swivel fitting between the air hose and pressure regulator which orients the hose diagonally with respect to a lateral axis along which the fitting is connected to the pressure regulator. The fitting is allowed to swivel with respect to the pressure regulator and the hose is allowed to swivel with respect to the fitting, which causes the hose to twist and kink when the diver turns his head in the direction of the hose. This type of fitting has not eliminated the problem of hose resistance encountered when the diver turns his head in the direction of the hose.

OBJECTS OF THE INVENTION

It is therefore the principal object of the present invention to provide improved apparatus for attaching a gas supply hose to a gas pressure regulator.

Another object of the invention is to provide apparatus for attaching an air supply hose to a pressure regulator, which substantially eliminates hose resistance encountered by a diver when the diver turns his head in the direction of the hose.

Yet another object of the invention is to provide an improved swivel mechanism for being interposed between an air supply hose and a pressure regulator to facilitate turning movement of the pressure regulator with respect to the air supply hose.

SUMMARY OF THE INVENTION

These and other objects are accomplished in accordance with the present invention wherein apparatus is provided for connecting a gas supply hose to a gas pressure regulator coupled to a mouthpiece of scuba equipment. The apparatus includes first and second elbow fittings, respective first ends of which are connected together and respective second ends of which are coupled to the pressure regulator and gas hose, respectively, such that the gas hose is coupled to the second end of the second elbow fitting along a first axis which is substantially parallel to a second axis along which the second end of the first elbow fitting is coupled to the pressure regulator. The gas hose and second elbow fitting are able to swivel with respect to the first elbow fitting and pressure regulator, around a third axis extending between the first and second axes, so that the pressure regulator can be turned in the direction of the gas hose without substantial resistance therefrom.

In accordance with another aspect of the invention, the second end of the first elbow fitting is secured to the pressure regulator to substantially prevent the first elbow fitting from swiveling with respect to the pressure regulator, around the second axis. By constraining the first elbow fitting and the pressure regulator to move together, the pressure regulator can be moved substantially free of resistance from the air hose, thereby facilitating the turning movement of the diver's head in the direction of the air hose.

DETAILED DESCRIPTION OF THE PREFERRED EMBODIMENT

Figure 1A:
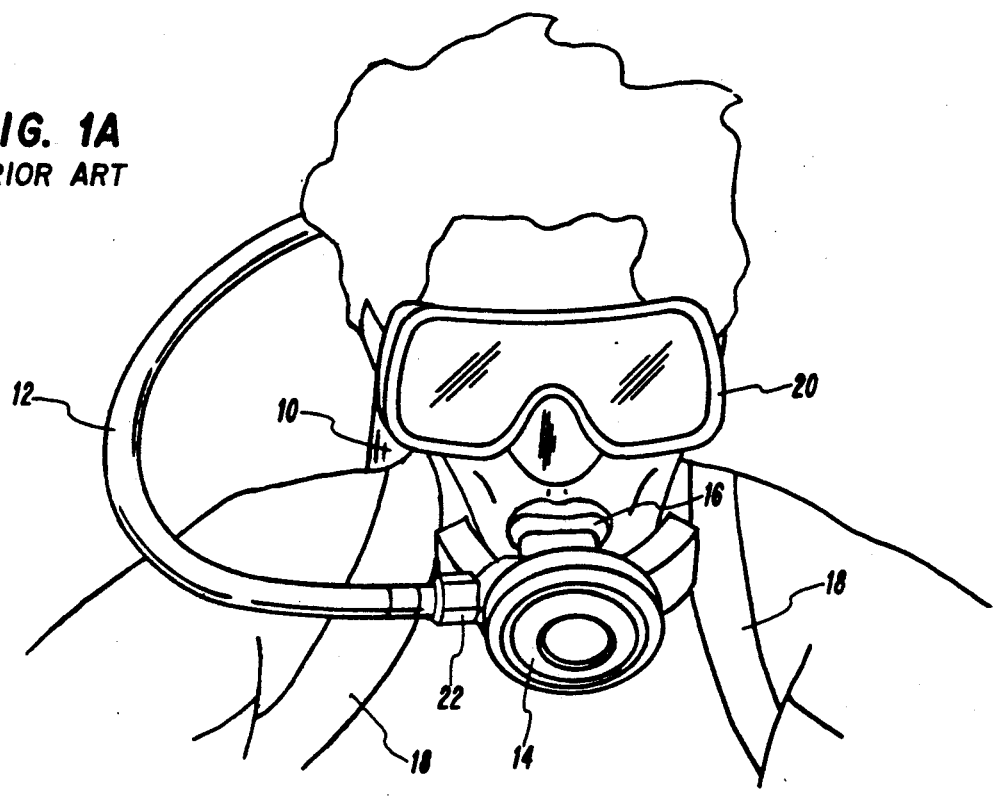
FIGS. 1A and 1B are respective perspective views illustrating prior art apparatus for coupling a gas supply hose to a gas pressure regulator.

In the description which follows, like parts are indicated throughout the specification and the drawings with the same reference numerals, respectively. The drawings are not necessarily to scale and the proportions of certain parts may have been exaggerated to better illustrate details of the present invention.

Figure 1B:
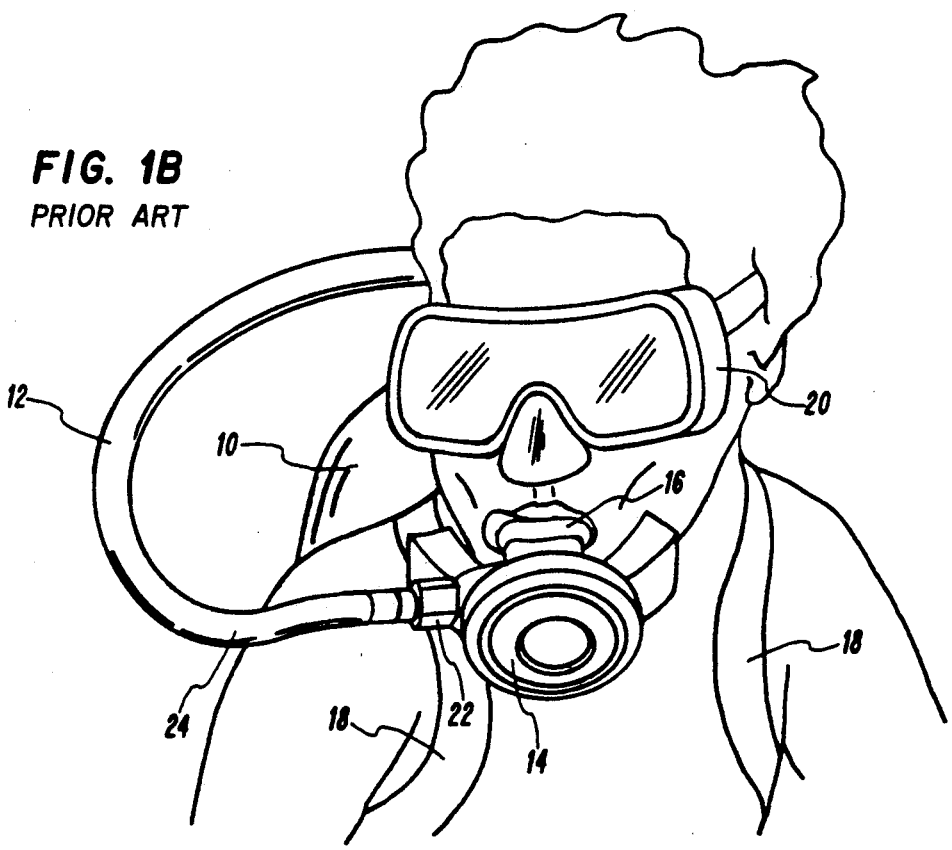

Referring to FIGS. 1A and 1B, scuba diving equipment typically includes a tank 10 for storing a compressed gas, such as compressed air, a hose 12 coupled between storage tank 10 and a second stage gas pressure regulator 14, and a mouthpiece 16 connected to pressure regulator 14, through which a diver inhales compressed gas and exhales waste gases. Storage tank 10 is carried on the diver's back by means of a pair of straps 18. A diving mask 20 is typically worn over the eyes and nose of the diver.

According to prior practice, hose 12 is connected to pressure regulator 14 by means of a male coupling member on one end of hose 12, which engages a complementary female member on one side of pressure regulator 14. An outer surface of the female coupling member is threaded for engaging complementary threads on an inner surface of a retaining nut 22, which is concentrically disposed on the male coupling member, whereby the male and female coupling members are retained in mating engagement.

As can be best seen in FIG. 1B, the pressurized hose 12 will tend to oppose any movement of the user's head in the direction of hose 12, which makes it uncomfortable for the diver to turn his head in the direction of hose 12. Furthermore, as shown in FIG. 1B, the turning movement of the diver's head in the direction of hose 12 tends to bend hose 12 in a portion thereof indicated at 24. Because hose 12 is substantially resistant to bending when it is pressurized with compressed gas, mouthpiece 16 may be dislodged from the diver's mouth when the diver turns his head in the direction of hose 12.

Referring to FIGS. 2A, 2B, 3, 4 and 5, a coupling apparatus 26 is provided in accordance with the present invention for connecting hose 12 to pressure regulator 14, such that the diver can turn his head in the direction of hose 12, substantially free of resistance from hose 12. As can be best seen in FIGS. 3 and 4, coupling apparatus 26 is comprised of first and second elbow fittings 28, 30. First and second elbow fittings 28, 30 include respective coupling members 32, 34, 36, 38. Coupling members 32, 34 and 38 are male members and coupling member 36 is a female member. Male member 32 and female member 36 of first elbow fitting 28 are oriented substantially at right angles with respect to one another, with male member 32 defining one end of first elbow fitting 28 and female member 36 defining an opposite end of first elbow fitting 28. Similarly, male members 34 and 38 are oriented substantially at right angles with respect to one another, with male member 34 defining one end of second elbow fitting 30 and male member 38 defines an opposite end of second elbow fitting 30.

One end 39 of male member 32 is threaded on an outer surface thereof, for engaging complementary threads on an inner surface of an attachment block 40, on which female member 36 is integrally formed, for connecting male member 32 to attachment block 40. An O-ring 42 is located on a recessed surface 44 of male member 32 to prevent leakage of compressed gas at the connection between male member 32 and attachment block 40.

An opposite end 41 of male member 32 is received within a complementary female member 46 on a fitting 48 extending from the right side (as viewed from the diver's perspective) of pressure regulator 14. Female member 46 is threaded on an outer surface thereof for engaging complementary threads on an inner surface of a retaining nut 50, which is concentrically disposed on male member 32. The threaded engagement between nut 50 and female member 46 retains male member 32 in mating engagement with female member 46. An O-ring 52 is located on a recessed surface 54 of male member 32 to prevent gas leakage at the connection between male member 32 and female member 46.

In accordance with a unique feature of the invention, a spacer member 56 is disposed on a surface 58 of male member 32 to limit the depth of insertion of male member 32 into female member 46. Spacer member 56 is comprised of a resilient material, so that spacer member 56 is compressible between a surface 60 of male member 32 which is in facing relationship with female member 46 and a distal end surface 62 of female member 46. As retaining nut 50 is tightened on female member 46, spacer member 56 is compressed between facing surface 60 and distal end surface 62, as can be best seen in FIG. 5, to substantially prevent male member 32 from rotating with respect to connector fitting 48 around a lateral axis 43, along which male member 32 is coupled to connector fitting 48. The diver can adjust the position of pressure regulator 14 for comfort by loosening retaining nut 50 and rotating connector fitting 48 with respect to male member 32 and then retightening nut 50 to retain pressure regulator 14 in the desired position. Elbow fittings 28, 30 are connected by the mating engagement between female member 36 and one end 45 of male member 34. An O-ring 64 is located on a recessed surface 66 of male member 34 to inhibit gas leakage at the connection between male member 34 and female member 36. An opposite end 47 of male member 34 is threaded on an outer surface thereof for engaging complementary threads on an inner surface of an attachment block 68 on which male member 38 is integrally formed, to connect male member 34 to attachment block 68. An O-ring 70 is located on a recessed surface 72 of male member 34, to inhibit gas leakage at the connection between male member 34 and attachment block 68. A retaining nut 74, which is threaded on an inner surface thereof, is concentrically disposed on male member 34, for engaging complementary threads on an outer surface of female member 36, for retaining male member 34 in mating engagement with female member 36. Male member 38 is threaded on an outer surface thereof for engaging complementary threads on an inner surface of retaining nut 76, which is carried on one end 77 of hose 12, whereby hose 12 is connected to elbow fitting 30.

Figure 2A:
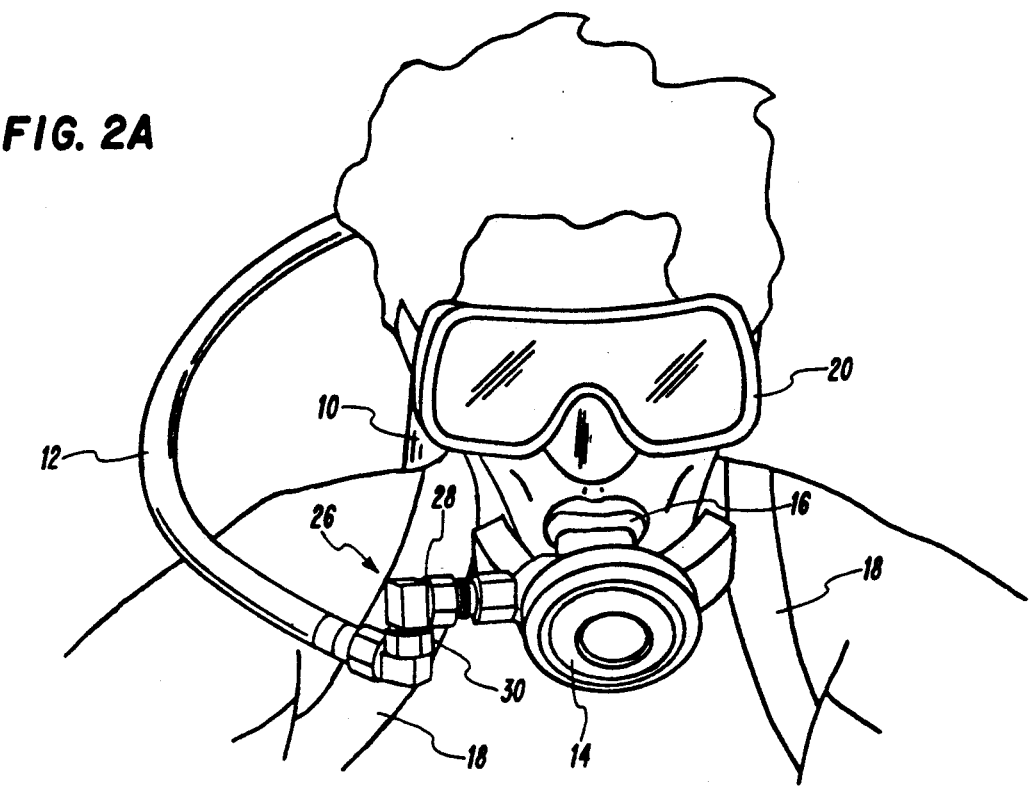
FIGS. 2A and 2B are respective perspective views of improved apparatus for coupling the gas supply hose to the gas pressure regulator, according to the present invention.
Figure 2B:
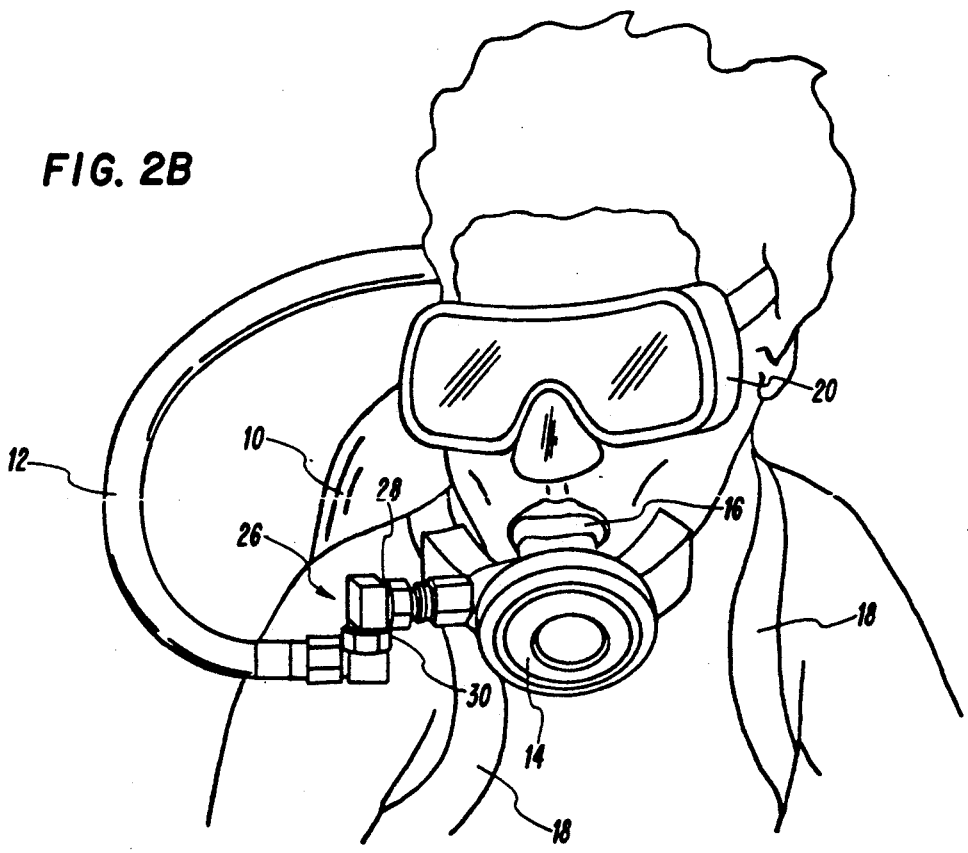
Figure 3:
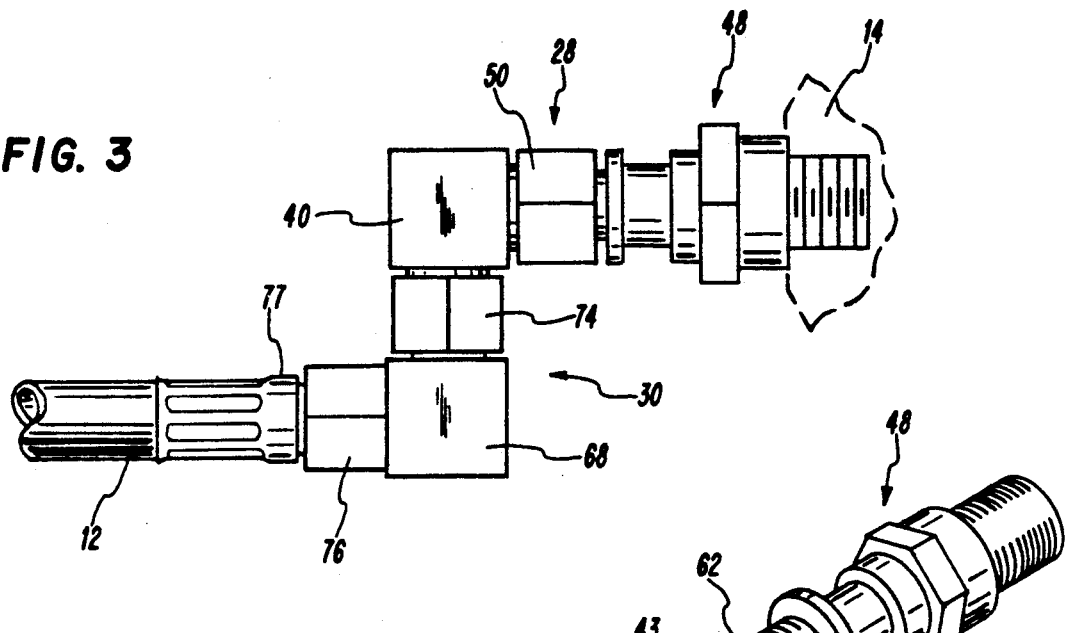
FIG. 3 is an elevation view of the improved coupling apparatus of FIGS. 2A and 2B.
Figure 4:
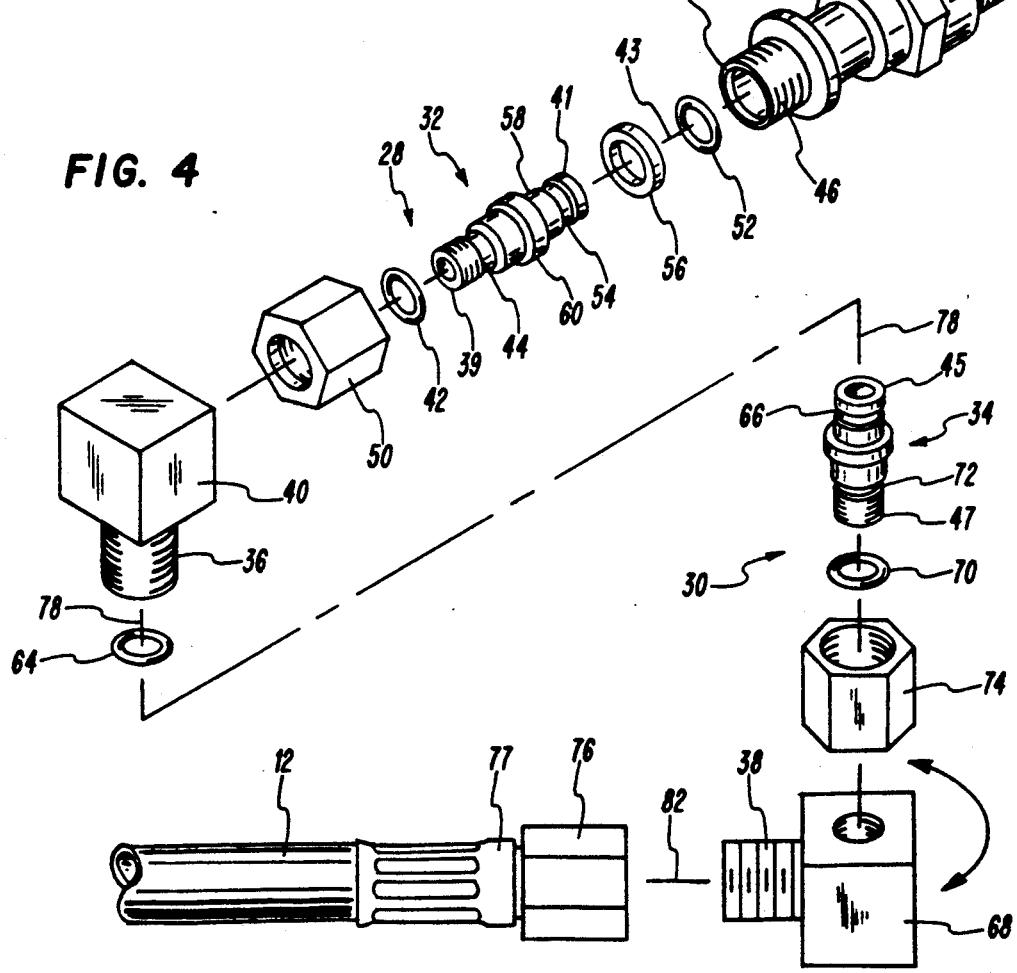
FIG. 4 is an exploded perspective view of the improved coupling apparatus of FIG. 3.
Figure 5:
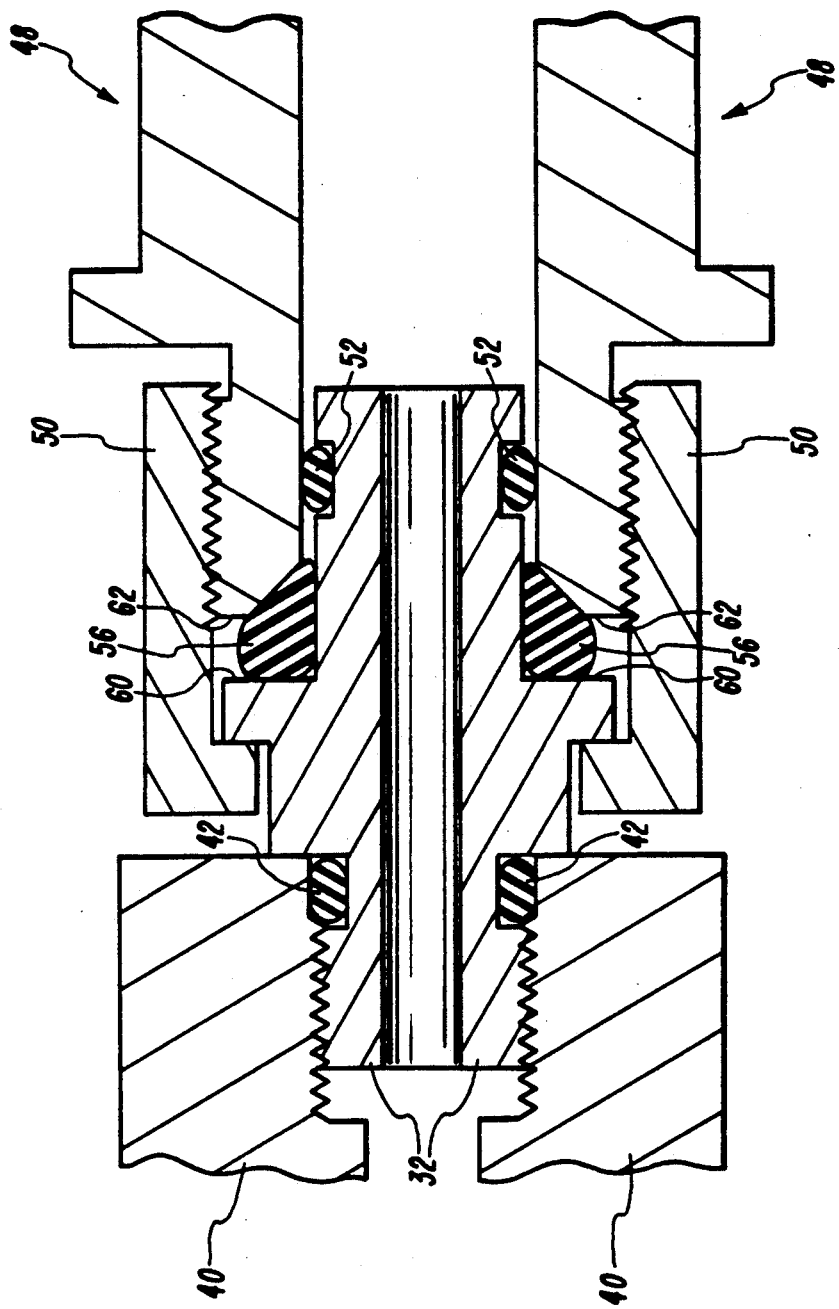
FIG. 5 is a sectional view of a portion of the coupling apparatus of FIG. 3, illustrating the attachment of the apparatus to the gas pressure regulator.

The mating engagement between male member 34 and female member 36 is such that elbow fittings 28, 30 are able to swivel with respect to one another about a vertical axis 78, which extends between lateral axis 43 and a lateral axis 82, along which hose 12 is connected to elbow fitting 30. When retaining nut 50 is secured on female member 46, elbow fitting 28 is prevented from swiveling with respect to connector fitting 48, around lateral axis 43. By limiting the swiveling movement to vertical axis 78, the diver is able to turn his head freely in the direction of hose 12 without substantial resistance from hose 12, as illustrated in FIG. 2B. When the diver turns his head to the right, as illustrated in FIG. 2B, hose 12 will swivel, along with elbow fitting 30, around vertical axis 78. The hose will not kink or bend, as occurs when prior art coupling apparatus are used. Therefore, the diver is not "working against the hose" when he turns his head in the direction of hose 12.

The coupling apparatus according to the present invention not only enhances the diver's comfort by substantially eliminating hose resistance when the diver turns his head in the direction of the hose but also decreases the likelihood that the diver's mouthpiece will become dislodged by hose resistance, which can be a dangerous situation underwater. The coupling apparatus is relatively easy to install and permits the angle of the pressure regulator and mouthpiece to be adjusted as desired.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. Apparatus for coupling a gas supply hose to a gas pressure regulator, said apparatus comprising:
   first and second elbow fittings, each of said first and second elbow fittings having opposed first and second ends;

first and second coupling members located at the respective first and second ends of said first elbow fitting and third and fourth coupling members located at the respective first and second ends of said second elbow fitting, said first coupling member being complementary with said third coupling member for coupling the respective first ends of said first and second elbow fittings along a first axis, said second coupling member being adapted for mating engagement with a complementary fitting of the gas pressure regulator along a second axis perpendicular to said first axis, said fourth coupling member being adapted for mating engagement with a complementary fitting of the gas supply hose along a third axis perpendicular to said first axis; and securing means for securing said second coupling member to the complementary fitting of the gas pressure regulator, such that said second coupling member is substantially secured against rotation about said second axis with respect to the gas pressure regulator.

2. Apparatus of claim 1 wherein said securing means includes a compressible spacer member carried on said first elbow fitting for limiting the depth of penetration of said second coupling member into the complementary fitting of the pressure regulator, said spacer member being compressible between a distal end of the complementary fitting of the pressure regulator and a surface of said second coupling member which is positionable in facing relationship with the distal end of the complementary fitting of the pressure regulator, thereby substantially securing said second coupling member against rotation about said second axis with respect to the pressure regulator.

3. The apparatus of claim 2 wherein said securing means further includes a retaining nut threaded on an inner surface thereof for engaging a complementary threaded outer surface of the complementary fitting of the pressure regulator, to retain said second coupling member in mating engagement with the complementary fitting of the pressure regulator, the threaded engagement between said retaining nut and the complementary fitting of the pressure regulator urging said second coupling member into the complementary fitting of the pressure regulator to compress said spacer member.

4. Scuba diving apparatus, comprising:
storage means for storing a compressed gas;
a flexible hose coupled at a first end thereof to said storage means for conveying compressed gas from said storage means;
a mouthpiece insertable into a diver's mouth to permit the diver to inhale compressed gas the exhale waste gases;
a gas pressure regulator attached to said mouthpiece; and
coupling means for coupling a second end of said hose, opposite the first end of said hose, to said gas pressure regulator to allow said compressed gas to flow from said hose to said gas pressure regulator, said coupling means including:
a first elbow fitting having a first body member with a first male member and a female member projecting therefrom, said female member being oriented substantially at a right angle with respect to said first male member, said first male member being in mating engagement with a complementary female fitting of said pressure regulator along a firs axis; and a second elbow fitting having a second body member with second and third male members projecting therefrom, said third male member being oriented substantially at a right angle with respect to said second male member, said second male member being in mating engagement with said female member to couple said first and second elbow fittings along a second axis perpendicular to said first axis, said third male member being in mating engagement with a complementary female fitting of said hose along a third axis substantially parallel to said first axis and substantially perpendicular to said second axis; and securing means for securing said first male member against rotation about said first axis with respect to said female fitting.

5. Apparatus of claim 4 wherein said securing means includes a compressible spacer member carried on said first male member, said space member being positionable between a distal end of said female fitting and a surface of said first male member in facing relationship with said distal end, to limit the depth of penetration of said first male member into said female fitting and to inhibit rotation of said first male member about said first axis with respect to said female fitting.

6. Apparatus of claim 5 wherein said female fitting is threaded on outer surface thereof, said securing means further including an attachment nut threaded on an inner surface thereof for engaging the threaded outer surface of said female fitting, to urge said first male member into said female fitting and compress said spacer member.

7. Apparatus for coupling a gas supply hose to a gas pressure regulator, said apparatus comprising first and second elbow fittings, each of said first and second elbow fittings having opposed first and second ends, the first and second ends of said first elbow fitting being respective female and first male ends, the first and second ends of said second elbow fitting being respective second and third male ends, said second male end being in mating engagement with said female end to couple said first and second elbow fittings, said first male end being adapted for mating engagement with a complementary female fitting of the pressure regulator, said third male end being adapted for mating engagement with a complementary female fitting of the hose, the hose and second elbow fitting below rotatable with respect to the pressure regulator and first elbow fitting about an axis along which said first and second elbow fittings are coupled, said apparatus further including securing means for securing said first male end to the female fitting of the pressure regulator, such that said first male end is substantially secured against rotation about a lateral axis along which said first elbow fitting is connectable to the pressure regulator.

8. The apparatus of claim 7 wherein said securing means includes a compressible spacer member carried on said first elbow fitting for limiting the depth of penetration of said first male end into the female fitting of the pressure regulator, said spacer member being compressible between a distal end of the female fitting of the pressure regulator and a surface of said first elbow fitting adjacent said first male end and in facing relationship with the distal end of the female fitting of the pressure regulator, thereby substantially preventing said first male end from rotating about said lateral axis with respect to the pressure regulator.

9. The apparatus of claim 8 wherein the female fitting of the pressure regulator is threaded on an outer surface thereof, said securing means further including a retaining nut threaded on an inner surface thereof for engaging the threaded outer surface of the female fitting of the pressure regulator, to retain said first male end in mating engagement with the female fitting of the pressure regulator, the threaded engagement between said retaining nut and the female fitting of the pressure regulator urging said first male end into the female fitting of the pressure regulator to compress said spacer member.

10. Scuba diving apparatus, comprising:
   storage means for storing a compressed gas;
   a flexible hose coupled at a first end thereof to said storage means for conveying compressed gas from said storage means;
   a mouthpiece insertable into a diver's mouth to permit the diver to inhale compressed gas and exhale waste gases;
   a gas pressure regulator attached to said mouthpiece;
   coupling means for coupling a second end of said hose, opposite the first end of said hose, to said pressure regulator to allow said compressed gas to flow from said hose to said pressure regulator, said coupling means including:
      a first elbow fitting having a first body member with a first male member and a female member projecting therefrom, said female member being oriented substantially at a right angle with respect to said first male member, said first male member being in mating engagement with a complementary female fitting of said pressure regulator along a first axis; and
      a second elbow fitting having a second body member with second and third male members projecting therefrom, said third male member being oriented substantially at a right angle with respect to said second male member, said second male member being in mating engagement with said female member to couple said first and second elbow fittings along a second axis perpendicular to said first axis, said third male member being in mating engagement with a complementary female fitting of said hose along a third axis substantially parallel to said first axis and substantially perpendicular to said second axis, said second male member being swivelably attached to said female member to allow a portion of said hose adjacent said third male member and said second elbow fitting to be swiveled about said second axis with respect to said first elbow fitting and said pressure regulator; and
      securing means for securing said first male member against rotation about said first axis with respect to said pressure regulator.

11. The apparatus of claim 10 wherein said securing means includes a compressible spacer member carried on said first male member for being sandwiched between a distal end of said female fitting and a surface of said first male member in facing relationship with said distal end, to limit the depth of penetration of said first male member into said female fitting and to inhibit rotation of said first male member about said first axis with respect to said female fitting.

12. The apparatus of claim 11 wherein said female fitting is threaded on outer surface thereof, said securing means further including an attachment nut threaded on an inner surface thereof for engaging the threaded outer surface of said female fitting, to urge said first male member into said female fitting and compress said spacer member.

* * * * *